United States Patent
Chen et al.

(10) Patent No.: US 12,111,563 B2
(45) Date of Patent: Oct. 8, 2024

(54) DISPLAY DEVICE AND CONTROL METHOD THEREOF

(71) Applicant: APPOTRONICS CORPORATION LIMITED, Guangdong (CN)

(72) Inventors: Chen Chen, Guangdong (CN); Fei Hu, Guangdong (CN); Xin Yu, Guangdong (CN); Yi Li, Guangdong (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 334 days.

(21) Appl. No.: 17/663,405

(22) Filed: May 13, 2022

(65) Prior Publication Data

US 2022/0269158 A1    Aug. 25, 2022

Related U.S. Application Data

(63) Continuation of application No. PCT/CN2020/126550, filed on Nov. 4, 2020.

(30) Foreign Application Priority Data

Nov. 13, 2019    (CN) .......................... 201911105729.4

(51) Int. Cl.
   *G02B 27/10*    (2006.01)
   *G03B 21/00*    (2006.01)
   (Continued)

(52) U.S. Cl.
   CPC ..... *G03B 21/2053* (2013.01); *G02B 27/1046* (2013.01); *G03B 21/005* (2013.01);
   (Continued)

(58) Field of Classification Search
   CPC .............. G03B 21/2053; G03B 21/005; G03B 21/2013; G03B 21/204; G03B 21/2066;
   (Continued)

(56) References Cited

U.S. PATENT DOCUMENTS

2003/0035123 A1    2/2003    Ramanujan et al.
2008/0088800 A1*   4/2008    Bellis .................. G03B 21/208
                                                        348/E5.142
(Continued)

FOREIGN PATENT DOCUMENTS

CN    1417619 A    5/2003
CN    1717715 A    1/2006
(Continued)

OTHER PUBLICATIONS

ISA China National Intellectual Property Administration, International Search Report Issued in Application No. PCT/CN2020/126550, Jan. 27, 2021, WIPO, 6 pages.

*Primary Examiner* — Magda Cruz
(74) *Attorney, Agent, or Firm* — McCoy Russell LLP

(57) ABSTRACT

The present disclosure provides a display device and a control method thereof. The control method of the display device comprises: obtaining, based on the first light output ratio and the second light output ratio, a first luminous flux set composed of values of luminous fluxes output by a combination path at a current bit depth, and a second luminous flux set composed of values of luminous fluxes output by the combination path at a target bit depth respectively; obtaining, based on the first luminous flux set and the second luminous flux set, a value of a luminous flux to be expanded to achieve the target bit depth at the current bit depth; and adjusting a mapping relationship between the value of each luminous flux to be expanded and a value of a maximum luminous flux in the first luminous flux set corresponding to the current bit depth based on a display bit depth of the display device.

20 Claims, 6 Drawing Sheets

(51) Int. Cl.
*G03B 21/20* (2006.01)
*G02B 26/00* (2006.01)

(52) U.S. Cl.
CPC ........ *G03B 21/2013* (2013.01); *G02B 26/008* (2013.01); *G03B 21/204* (2013.01)

(58) Field of Classification Search
CPC .. G03B 21/20; G02B 27/1046; G02B 26/008; G02B 27/1026; H04N 9/3161; H04N 9/3105; H04N 9/3111; H04N 9/3123; H04N 9/3155; H04N 9/3164
See application file for complete search history.

(56) References Cited

U.S. PATENT DOCUMENTS

| | | | | |
|---|---|---|---|---|
| 2008/0117386 A1* | 5/2008 | Mizouchi | ............ | H04N 9/3105 |
| | | | | 353/34 |
| 2009/0135313 A1* | 5/2009 | Endo | ................... | G03B 21/005 |
| | | | | 348/E5.142 |
| 2016/0119595 A1* | 4/2016 | Lyubarsky | ......... | G02B 27/0961 |
| | | | | 353/121 |
| 2016/0131968 A1* | 5/2016 | Okamoto | .............. | H01S 5/0683 |
| | | | | 315/151 |

FOREIGN PATENT DOCUMENTS

| | | |
|---|---|---|
| CN | 107797368 A | 3/2018 |
| CN | 109765745 A | 5/2019 |
| EP | 1174752 A1 | 1/2002 |

\* cited by examiner

DISPLAY DEVICE AND CONTROL METHOD THEREOF

CROSS-REFERENCE TO RELATED APPLICATION

This application is a continuation of International Application No. PCT/CN2020/126550, filed on Nov. 4, 2020, which claims priority to Chinese Patent Application No. 201911105729.4, filed on Nov. 13, 2019. All of the aforementioned applications are hereby incorporated by reference in their entireties.

TECHNICAL FIELD

The present disclosure relates to the technical field of display, and in particular to a display device and a control method thereof.

BACKGROUND

Projection systems having dual spatial light modulators in related art involve temporal and spatial light splitting. The light source system usually emits blue light and yellow light in a time-sharing manner. After incident to the optical engine, the yellow light is spatially split into red light and green light, which then enter two spatial light modulators for simultaneous processing. According to different product requirements, the blue light shares the spatial light modulator with the red light or green light.

SUMMARY

A first aspect of the present disclosure provides a display device, including: a light source system, a light splitting element, a first light modulator, and a second light modulator. The light source system is configured to emit a plurality of primary color light. The light splitting element is configured to split at least one of the plurality of emitted primary color light into first light and second light, where a luminous flux ratio of the first light to the primary color light is defined as a first light output ratio, and a luminous flux ratio of the second light to the primary color light is defined as a second light output ratio. The first light modulator is located in a light path of the first light to modulate the first light and output a first luminous flux unit based on the first light and a minimum modulation duration of the first light modulator. The second light modulator is located in a light path of the second light to modulate the second light to output the second light along a same light path as the first light after being modulated, and outputs a second luminous flux unit based on the second light and a minimum modulation duration of the second light modulator. A second luminous flux set is obtained by performing preset processing on a first luminous flux set composed of luminous fluxes output by a combination path in which light output by the first light modulator and light output by the second light modulator are combined; and the second luminous flux set corresponds to a luminous flux set at a high display bit depth of the display device, so as to increase the display bit depth of the display device.

BRIEF DESCRIPTION OF THE FIGURES

To describe the technical solutions in the embodiments/implementations of the present disclosure more clearly, the following briefly describes the drawings required for describing the embodiments/implementations. Apparently, the drawings in the following description show merely some embodiments/implementations of the present disclosure, and those of ordinary skill in the art may further derive other drawings from these drawings without creative efforts.

DETAILED DESCRIPTION

Figure 1:
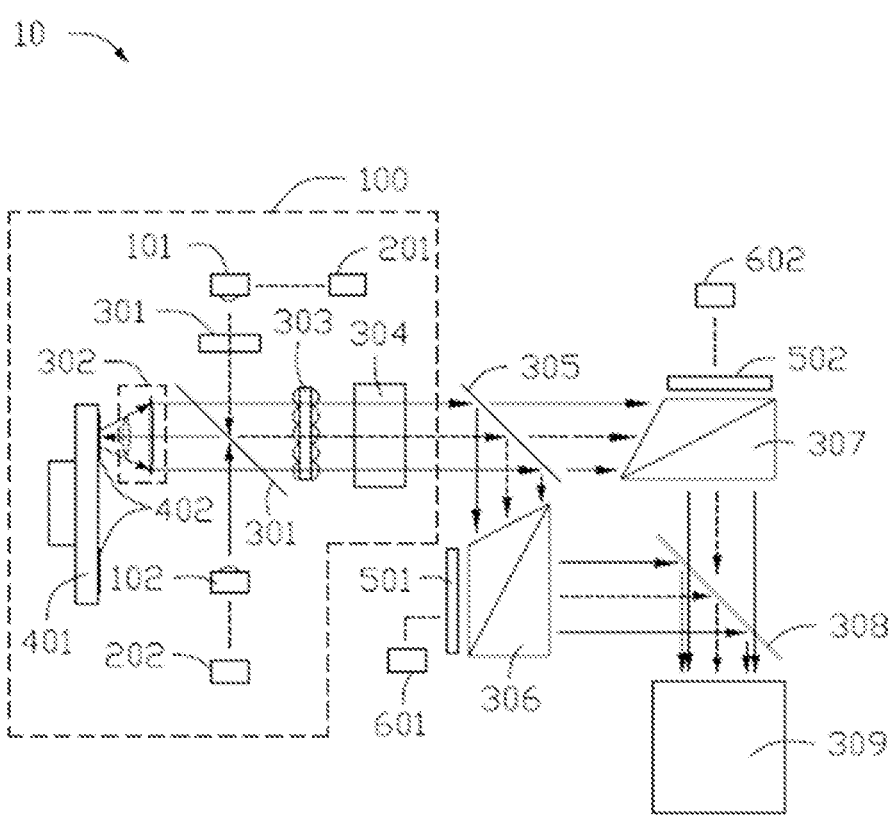
FIG. 1 is a structural diagram of a display device according to an embodiment of the present disclosure.

The present disclosure is further described in the following detailed description with reference to the drawings.

To make the objectives, features and advantages of the present disclosure more comprehensible, the present disclosure is described in detail below with reference to the drawings and specific embodiments. It should be noted that the embodiments of the present disclosure and features of the embodiments may be combined with each other in case of no conflict.

Many specific details are set forth in the following description to facilitate a full understanding of the present disclosure. The described embodiments are merely some rather than all of the embodiments of the present disclosure. All other embodiments obtained by those of ordinary skill in the art based on the embodiments of the present disclosure without creative efforts shall fall within the protection scope of the present disclosure.

Unless otherwise defined, all technical and scientific terms used herein have the same meanings as commonly understood by those skilled in the technical field of the present disclosure. The terms used in the specification of the present disclosure are only for the purpose of describing specific embodiments, rather than to limit the present disclosure.

Usually, for white balance consideration, the modulation duration of the blue light will be shortened. Accordingly, after modulation, the bit depth of the blue light signifying the color grayscale is less than that of the green light and red light split from the yellow light, resulting in insufficient color gradation of the blue light after modulation.

In addition, the green light and the red light split from the yellow light period may generate different heat loads on the two spatial light modulators, resulting in different temperature rises of the two spatial light modulators. Due to the thermal effects such as thermal expansion, the two spatial light modulators have a difference in image shift, thereby causing relative displacement of the two spatial light modulators, resulting in deterioration of display quality.\

The present disclosure provides a control method of a display device. The control method splits the same primary color light into first light and second light and makes the first light and the second light enter a first light modulator and a second light modulator for modulation to increase a display bit depth of the primary color light, thereby enriching image details of a display screen. The present disclosure further provides another control method of the display device, which controls a difference in heat loads generated on the first light modulator and the second light modulator. The control method avoids an image shift difference between the first light modulator and the second light modulator due to unbalanced temperature rises of the first light modulator and the second light modulator. In addition, the control method avoids relative displacement of the first light modulator and the second light modulator, thereby preventing the display quality of the display screen from being deteriorated. The display device in the embodiment of the present disclosure may be a cinema projector, an educational projector, a laser television, a pico-projector, or an engineering projector, etc.

It should be noted that, in the present disclosure, a "current bit depth" refers to a display bit depth of a grayscale image presented by image light modulated by a single light modulator, that is, a display bit depth of a grayscale image presented by incident primary color light modulated by a light modulator alone. A "target bit depth" refers to a display bit depth of a grayscale image, displayed by the display device, presented by the primary color light modulated by two or more light modulators in parallel. Normally, the "target bit depth" is greater than the "current bit depth", so the display bit depth of the grayscale image output by the display device can be increased. For example, when a single light modulator modulates primary color light alone, an output bit depth, that is, the "current bit depth" is n. Thus, when two or more light modulators modulate primary color light with different luminous flux distributions, the display bit depth of the grayscale image output by the display device is n+s, s being an integer greater than or equal to 1.

In an embodiment, the light source system emits third primary color light and mixed light composed of first primary color light and second primary color light; and the third primary color light is split by the light splitting element into the first light and the second light.

In an embodiment, in a first time sequence, the first primary color light enters the first light modulator for modulation, and the second primary color light enters the second light modulator for modulation; and in a second time sequence, the first light enters the first light modulator for modulation, and the second light enters the second light modulator for modulation.

In an embodiment, a difference between a sum of heat loads generated by the first primary color light and a part of the third primary color light on the first light modulator and a sum of heat loads generated by the second primary color light and a part of the third primary color light on the second light modulator is less than a preset threshold.

In an embodiment, a light attenuation element is arranged in the light path of the first light to reduce the first luminous flux unit modulated and output by the first light modulator; or a light attenuation element is arranged in the light path of the second light to reduce the second luminous flux unit modulated and output by the second light modulator.

In an embodiment, a ratio of the second light output ratio to the first light output ratio is $2^s-1$, s being a positive integer.

In an embodiment, a ratio of the second light output ratio to the first light output ratio is greater than $2^s-1$ and less than $2^{s+1}-1$, s being a positive integer.

The present disclosure further provides a control method of a display device, where the display device includes: a light source system configured to emit a plurality of primary color light, and a light splitting element configured to split at least one of the plurality of emitted primary color light into first light and second light, where a luminous flux ratio of the first light to the primary color light is defined as a first light output ratio, and a luminous flux ratio of the second light to the primary color light is defined as a second light output ratio; and the control method includes the following steps:

obtaining, based on the first light output ratio and the second light output ratio, a first luminous flux set composed of values of luminous fluxes output by a combination path at a current bit depth and a second luminous flux set composed of values of luminous fluxes output by the combination path at a target bit depth;

obtaining, based on the first luminous flux set and the second luminous flux set, a value of a luminous flux to be expanded to achieve the target bit depth at the current bit depth; and setting a mapping relationship between the value of each luminous flux to be expanded and a value of a maximum luminous flux in the first luminous flux set corresponding to the current bit depth, so as to increase a display bit depth of the display device.

In an embodiment, said obtaining, based on the first light output ratio and the second light output ratio, a first luminous flux set composed of values of luminous fluxes output by a combination path at a current bit depth and a second luminous flux set composed of values of luminous fluxes achievable by the combination path at a target bit depth includes the following steps:

obtaining, based on the first light output ratio and the second light output ratio, minimum luminous flux units output by a first light modulator and a second light modulator within a minimum modulation duration, and defining the minimum luminous flux units as a first luminous flux unit and a second luminous flux unit, respectively; and obtaining, based on the minimum luminous flux units modulated by the first light modulator and the second light modulator, the first luminous flux set composed of values of luminous fluxes output by the combination path at the current bit depth and the second luminous flux set composed of values of luminous fluxes output by the combination path at the target bit depth.

In an embodiment, said obtaining, based on the first light output ratio and the second light output ratio, minimum luminous flux units output by a first light modulator and a second light modulator within a minimum modulation duration includes the following steps:

obtaining, by assuming that the first light and the second light are modulated by the first light modulator or the second light modulator, a minimum luminous flux unit output by the first light modulator or the second light modulator within the minimum modulation duration at the current bit depth unit, and defining the minimum luminous flux unit as a standard luminous flux unit; and obtaining, based on the standard luminous flux unit, the first light output ratio and the second light output ratio, the minimum luminous flux units output by the first light modulator and the second light modulator within the minimum modulation duration.

In an embodiment, the standard luminous flux unit is $E_0$;

the first light output ratio is R, $R \leq 1$, and the minimum luminous flux unit modulated by the first light modulator within the minimum modulation duration is $RE_0$;

the second light output ratio is T, $T \leq 1$, and the minimum luminous flux unit output by the second light modulator within the minimum modulation duration is $TE_0$; and the first luminous flux set composed of the values of the luminous fluxes output by the combination path at the current bit depth is $$E_{total} = \sum_{i=1}^{2^n-1} r_i RE_0 + \sum_{j=1}^{2^n-1} t_j TE_0,$$

where $0 \leq r_i \leq 1$, $r_i$ denoting a state corresponding to an i-th modulation of the first light modulator in each frame of image; and $0 \leq t_j \leq 1$, $t_j$ denoting a state corresponding to a j-th modulation of the second light modulator in each frame of image.

In an embodiment, if a ratio of the second light output ratio T to the first light output ratio R is $2^s-1$, s being a positive integer, luminous fluxes output by the combination path include a first luminous flux set composed of a total of $2^{n+s}-2^s+1$ luminous fluxes incremented by $$\frac{E_0}{2^s}$$

as an unit, and luminous mixes output by the combination path at the target bit depth include a second luminous flux set composed of a total of $2^{n+s}$ luminous fluxes incremented by $$\frac{E_0}{2^s}$$

as an unit.

In an embodiment, the control method further includes: obtaining, based on the first luminous flux set and the second luminous flux set, a luminous flux subset missing in the first luminous flux set compared to the second luminous flux set; and adding a value of the luminous flux subset missing in the first luminous flux set based on the luminous flux mapping relationship.

In an embodiment, the control method further includes: allowing the luminous flux subset missing in the first luminous flux set to correspond to the same mapping relationship, such that the value of the luminous flux subset that is missed is equal to a value of a maximum luminous flux in the first luminous flux set.

In the display device and the control method thereof provided by the present disclosure, the display bit depth of the primary color light is increased by distributing the primary color light to the first light modulator and the second light modulator for modulation, thereby improving the color gradation displayed by the primary color light. Meanwhile, the solution of distributing the primary color light to different spatial light modulators can compensate for the difference in the heat loads of the spatial light modulators. It avoids the image shift difference between the first light modulator and the second light modulator due to the unbalanced temperature rises thereof, thereby avoiding the relative displacement of the two light modulators, which leads to deterioration of display quality.

First Embodiment

The first embodiment of the present disclosure provides a display device 10 and a control method thereof. Referring to FIG. 1, the display device 10 includes a light source system 100, a light splitting element 305, a first light modulator 501 and a second light modulator 502.

The light source system 100 is configured to emit a plurality of primary color light. In this embodiment, the light source system 100 is configured to emit mixed light and third primary color light. The mixed light is formed by mixing first primary color light and second primary color light.

The light splitting element 305 is configured to split the at least one of the plurality of primary color light emitted by the light source system 100 to obtain first light and second light. In this embodiment, the light splitting element 305 is configured to guide the first primary color light in the mixed light and a part of the third primary color light into a first light path (referred to as a reflection path in this embodiment). It is also configured to guide the second primary color light in the mixed light and a part of the third primary color light into a second light path (referred to as a transmission path in this embodiment). For convenience of description, hereinafter, the part of the third primary color light entering the first light path is referred to as first light, and the part of the third primary color light entering the second light path is referred to as second light. A ratio of a luminous flux of the first light entering the first light path to a luminous flux of the third primary color light incident on the light splitting element 305 is referred to as a first light output ratio (i.e. a reflectance of the light splitting element 305 to reflect the third primary color light). A ratio of a luminous flux of the second light entering the second light path to the luminous flux of the third primary color light incident on the light splitting element 305 is referred to as a second light output ratio (i.e. a transmittance of the light splitting element 305 to the light splitting element).

Specifically, in the present disclosure, the light splitting element 305 can split the light in a polarization manner, that is, it divides the incident third primary color light into the first light with a first polarized state along the first light path and the second light with a second polarized state along the second light path. The first polarized state is an S state, and the second polarized state is a P state. In this case, the light splitting element 305 reflects the S-state light and transmits the P-state light. It should be noted that when the light splitting element 305 splits the light in a polarization manner, a light combining element 308 should also adopt a polarization manner.

The first light modulator 501 is located in the light path of the first light (i.e. the first light path), and is configured to modulate the first light. In this embodiment, the first light modulator 501 is configured to modulate the first primary color light and the part of the third primary color light in a time-sharing manner to obtain first image light and a part of third image light, respectively. The second light modulator 502 is located in the light path of the second light (i.e. the second light path), and is configured to modulate the second light. In this embodiment, the second light modulator 502 is configured to modulate the second primary color light and the part of the third primary color light in a time-sharing manner to obtain second image light and a part of third image light, respectively.

Figure 2:
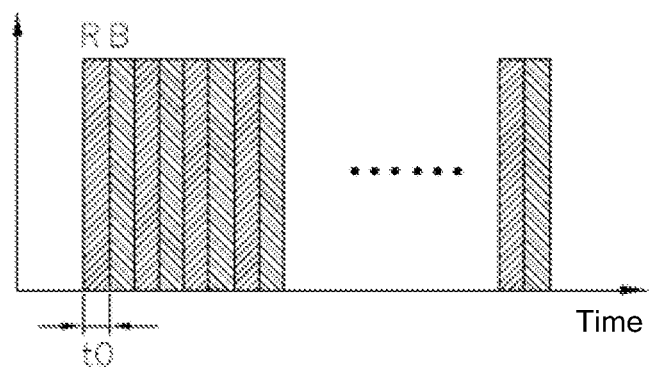
FIG. 2 is a sequence diagram of light emitted by a light source system of the display device shown in FIG. 1.
Figure 2:
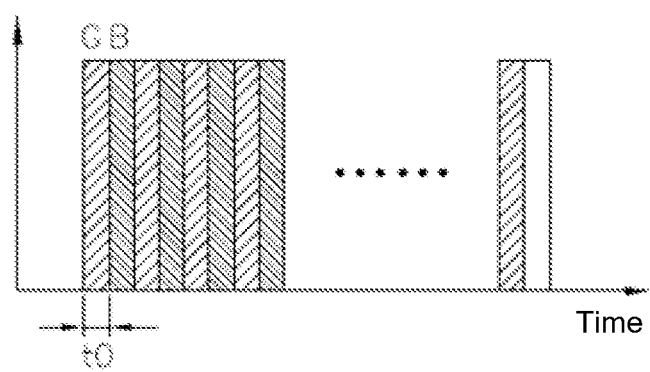

Further, the light source system 100 includes a first light source 101 and a second light source 102. The first light source 101 is configured to emit the third primary color light, and the second light source is configured to emit excitation light. In this embodiment, the first light source 101 emits blue laser light as the third primary color light, and the second light source 102 emits blue excitation light. The light source system 100 further includes a light source controller 201 and a light source controller 202 for regulating driving currents of the first light source 101 and the second light source 102, respectively. Referring to FIG. 2, a time period corresponding to red light and green light emitted by the light source system 100 is referred to as a first time sequence. In the first time sequence, the first light source 101 is in an off state, and the second light source 102 is in an on state. A time period corresponding to blue light emitted by the light source system 100 is referred to as a second time sequence. In the second time sequence, the first light source 101 is in an on state, and the second light source 102 is in an off state.

For the convenience of description, hereinafter, the first time sequence is referred to as a "yellow light period", and the second time sequence is referred to as a "blue light period". Referring to FIG. 1, in the yellow light period, the blue excitation light generated by the second light source 102 is incident on a yellow-transmitting and blue-reflecting wave plate 301, and is reflected to a wavelength conversion apparatus 401 with a surface covered with a yellow phosphor 402 to generate yellow fluorescent light. The generated yellow fluorescent light is collected by a fluorescent light collection lens assembly 302, transmitted by the yellow-transmitting and blue-reflecting wave plate 301, and enters a homogenizing element 303. The homogenizing element 303 may be a square bar or a fly-eye device or other device that can realize a homogenizing function. The yellow fluorescent light is homogenized by the homogenizing element 303, then incident on a relay lens 304, and exits from the light source system 100. In the blue light period, the blue laser light generated by the first light source 101 is incident on the yellow-transmitting and blue-reflecting wave plate 301, reflected to the homogenizing element 303, passes through the relay lens 304, and exits from the light source system 100.

Further, the light source system 100 includes the wavelength conversion apparatus 401. The surface of the wavelength conversion apparatus 401 is provided with the yellow phosphor 402 for generating yellow fluorescent light as first wavelength light under the excitation of the excitation light emitted by the second light source 102. The yellow fluorescent light is split into the first primary color light and the second primary color light. In the present disclosure, the first primary color light is red light split from yellow fluorescent light, and the second primary color light is green light split from yellow fluorescent light. The wavelength conversion apparatus 401 may be a color wheel or a fixed fluorescent plate.

The first wavelength light (yellow fluorescent light) and the third primary color light (blue light) emitted from the light source system 100 are projected onto the light splitting element 305. In this embodiment, in the yellow light period, the light splitting element 305 is configured to guide the red light in the yellow fluorescent light into the first light path and guide the green light in the yellow fluorescent light into the second light path. In the blue light period, the light splitting element is configured to split the blue light into two parts and guide the two parts into the first light path and the second light path, respectively. The light splitting element 305 is, for example, a wavelength-based polarizing beam splitter (PBS).

In this embodiment, the first light modulator 501 is configured to modulate red light and blue light in a time-sharing manner, and the second light modulator 502 is configured to modulate green light and blue light in a time-sharing manner. In this embodiment, the first light modulator 501 and the second light modulator 502 are digital micro-mirror devices (DMDs). In other embodiments, the first light modulator 501 and the second light modulator 502 may also be liquid crystal displays (LCDs) or liquid crystal on silicon (LCoS). The red light and the blue light entering the first light path pass through a total internal reflection (TIR) prism 306 for uniform illumination on a modulation surface of the first light modulator 501. The green light and the blue light entering the second light path pass through a TIR prism 307 for uniform illumination on a modulation surface of the second light modulator 502. The red light and the green light are gray-modulated by the first light modulator 501 and the second light modulator 502 to output the first image light and the second image light. The blue light is gray-modulated by the first light modulator 501 and the second light modulator 502 to output parts of the third image light. The first image light, the second image light and the third image light are combined by a light combining element 308 and output to a lens 309.

It can be understood that the primary color light mentioned herein refers to base light that can be used to synthesize light of other colors. The primary color light can be monochromatic light, such as red light, green light and blue light commonly used in the art; secondary color light, such as magenta light, yellow light and cyan light; and light of other mixed colors. The premise is that when a certain color of the screen is not outstanding, the display effect of the screen can be improved by adding and mixing the primary color light of the corresponding color. It should be noted that, in this implementation, the blue primary color light is simultaneously modulated by the first light modulator 501 and the second light modulator 502 to form the third image light. It can be understood that, in other implementations, the green primary color light and the red primary color light can be simultaneously modulated by the first light modulator 501 and the second light modulator 502 to output image light, but the solution is also within the protection scope of the present disclosure.

Figure 3:
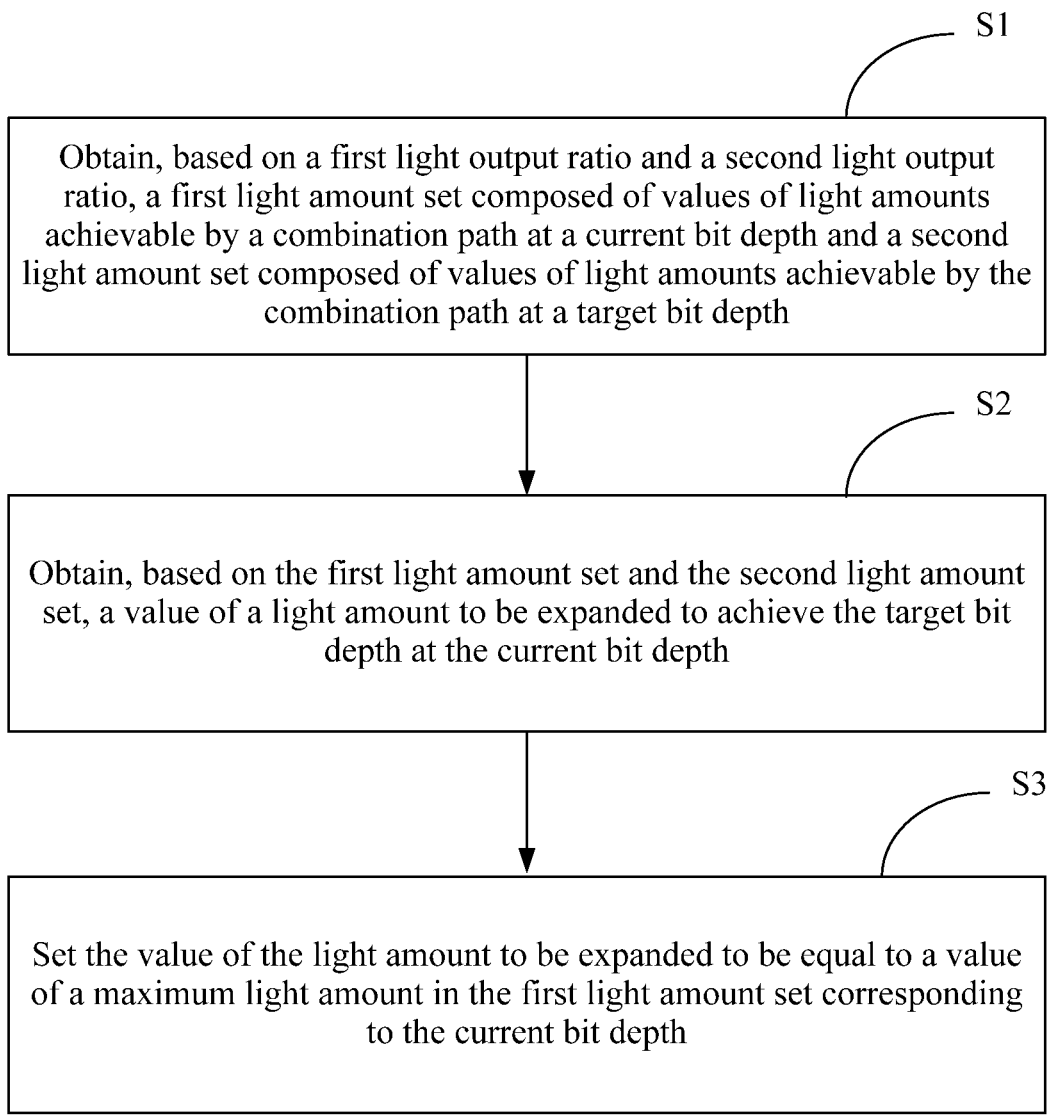
FIG. 3 to FIG. 5 are flowcharts of steps of a control method of the display device according to a first embodiment of the present disclosure.

Referring to FIG. 3, the control method of the display device 10 includes the following steps:

S1: Obtain, based on a first light output ratio and a second light output ratio, a first luminous flux set composed of values of luminous fluxes output by a combination path at a current bit depth and a second luminous flux set composed of values of luminous fluxes output by the combination path at a target bit depth.

Figure 4:
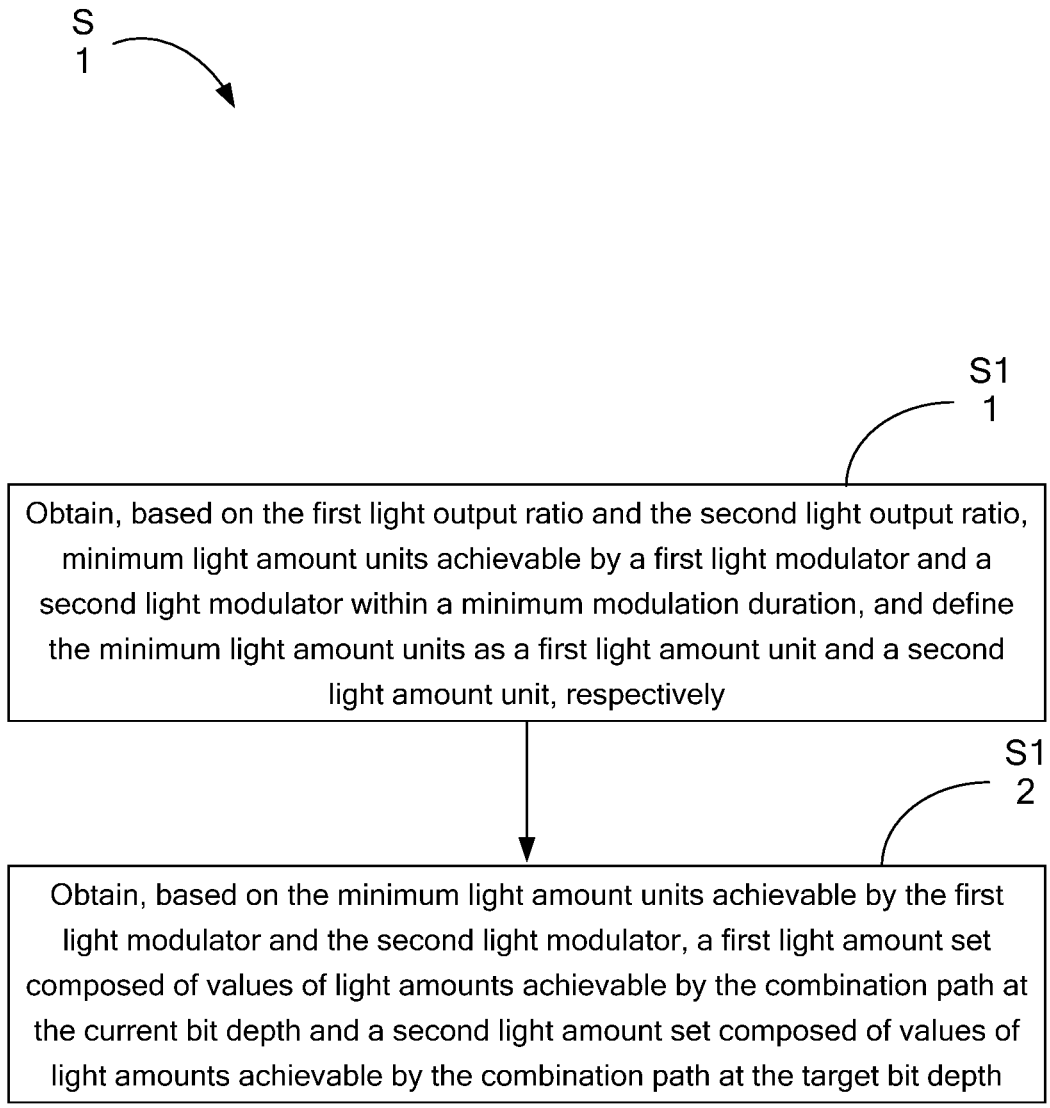

Referring to FIG. 4, further, S1 includes S11 and S12:

S11: Obtaining, based on the first light output ratio and the second light output ratio, minimum luminous flux units output by the first light modulator 501 and the second light modulator 502 within a minimum modulation duration, and defining the minimum luminous flux units as a first luminous flux unit and a second luminous flux unit, respectively.

Figure 5:
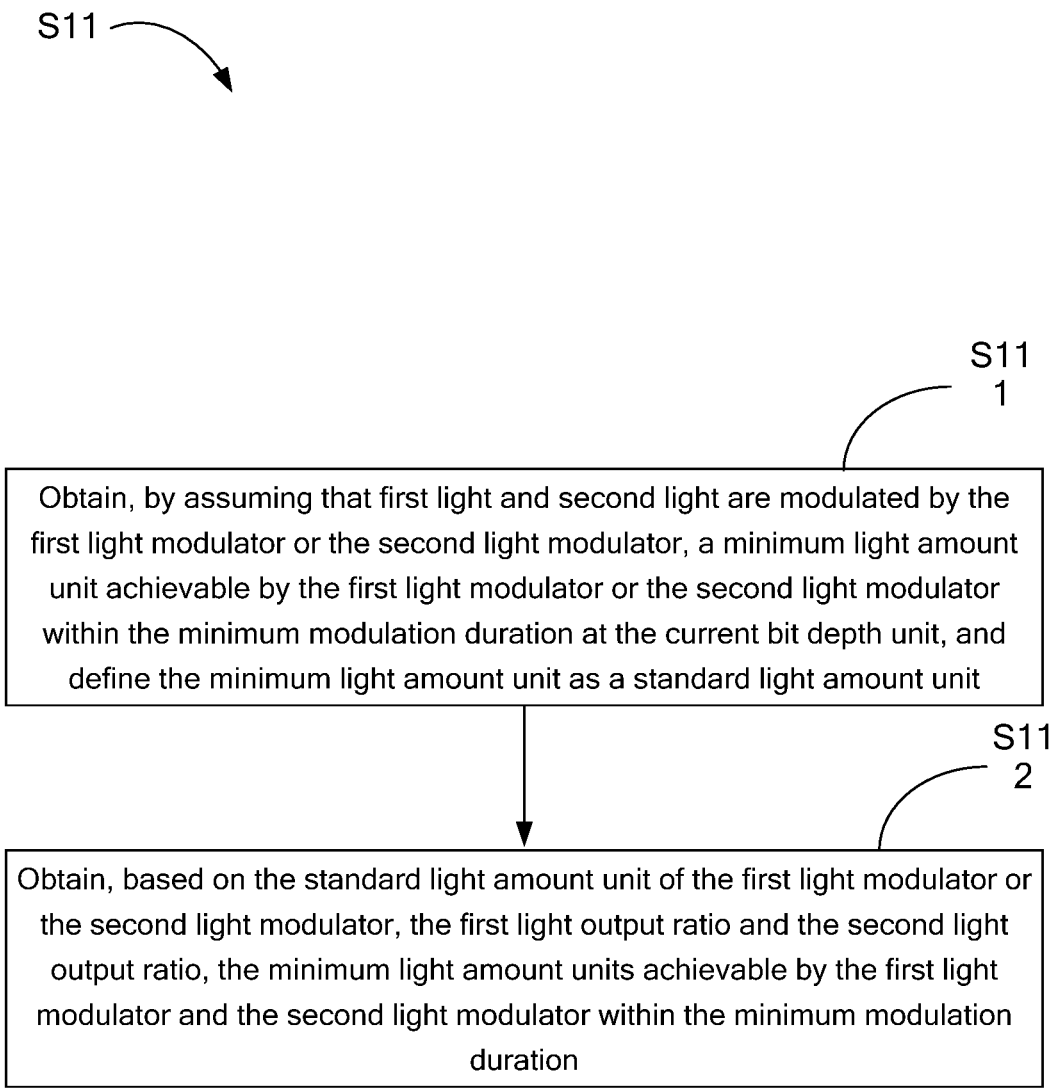

In this embodiment, the minimum modulation duration, denoted as $t_{LSB}$, refers to a modulation time corresponding to a least significant bit (LSB) displayed by the first light modulator 501 or the second light modulator 502. The first light modulator 501 and the second light modulator 502 are DMDs. Referring to FIG. 5, further, S11 includes S111 and S112:

S111: Obtaining, by assuming that first light and second light are modulated by the first light modulator or the second light modulator, a minimum luminous flux unit output by the first light modulator or the second light modulator within the minimum modulation duration at the current bit depth unit, and defining the minimum luminous flux unit as a standard luminous flux unit.

In an embodiment, it is assumed that the first light modulator 501 and the second light modulator 502 in the light path can individually temporally implement n-bit display. In other words, the current bit depths of the first light modulator 501 and the second light modulator 502 are n bits. Since the modulation time corresponding to the LSB is $t_{LSB}$, when the incident light is completely incident on the first light modulator 501 or the second light modulator 502, the standard luminous flux unit $E_0$ displayed by any pixel corresponds to $t_{LSB}$ S112: Obtaining, based on the standard luminous flux unit of the first light modulator 501 or the second light modulator 502, the first light output ratio and the second light output ratio, the minimum luminous flux units output by the first light modulator 501 and the second light modulator 502 within the minimum modulation duration.

In this embodiment, if the first light modulator 501 and the second light modulator 502 are simultaneously used in a reflection path and a transmission path, when all micromirrors of the second light modulator 502 corresponding to the transmitted light are in the off state, the luminous flux corresponding to the LSB in the reflection path is $RE_0$, that is, the first luminous flux unit, $RE_0 \leq E_0 (R \leq 1)$, R being the reflectance of the light splitting element 305 in the light path. When all micromirrors of the first light modulator 501 in the reflection path are in the off state, the luminous flux corresponding to the LSB in the transmission path is $TE_0$, that is, the second luminous flux unit, $TE_0 \leq E_0 (T \leq 1)$, T being the transmittance of the light splitting element 305 in the light path. Therefore, the minimum luminous flux unit output in the visible light path is $\min(R, T)*E_0 \leq E_0$. Compared with the solution in which the first light and the second light all enter the first light modulator 501 or the second light modulator 502 for modulation, in this embodiment, the minimum luminous flux unit is reduced, so the displayable bit depth of the display device 10 can be increased.

In an embodiment, the luminous flux is equally distributed between the transmission path and the reflection path, R=T. In general, R+T=1, then R=T=½. Therefore, the luminous flux corresponding to the LSB in the first light path (reflection path) and the second light path (transmission path) is $$\frac{E_0}{2}.$$

That is, both the first luminous flux unit $RE_0$ and the second luminous flux unit $TE_0$ are $$\frac{E_0}{2}.$$

In this case, the minimum luminous flux unit of the third primary color in the combination path is $$\frac{E_0}{2}.$$

Compared with the solution in which of the third primary color light is modulated by a single spatial light modulation, in this embodiment, the minimum luminous flux unit $E_0$ is reduced, so the displayable bit depth can be increased.

S12: Obtaining, based on the minimum luminous flux units output by the first light modulator 501 and the second light modulator 502, a first luminous flux set composed of values of luminous fluxes output by the combination path at the current bit depth, and a second luminous flux set composed of values of luminous fluxes output by the combination path at the target bit depth.

In this embodiment, the displayable luminous flux $E_{total}$ after combination is defined by a mathematical expression $$E_{total} = \sum_{i=1}^{2^n-1} r_i RE_0 + \sum_{j=1}^{2^n-1} t_j TE_0.$$

$r_i$ is 0 or 1, indicating a state corresponding to an i-th flip of the micromirror in a frame in the reflection path. 0 corresponds to an off state of the micromirrors, and 1 corresponds to an on state of the micromirrors. $t_j$ is 0 or 1, indicating a state corresponding to a j-th flip of the micromirror in a frame in the transmission path. 0 corresponds to an off state of the micromirrors, and 1 corresponds to an on state of the micromirrors.

In this embodiment, for example, the luminous flux is equally distributed between the reflection path and the transmission path, and the target bit depth is n+1 bits. In this case, the minimum luminous flux unit to be modulated is $$\frac{E_0}{2},$$

and the first luminous flux set composed of the displayable luminous fluxes $E_{total}$ after combination is $$\left\{0, \frac{E_0}{2}, 2\frac{E_0}{2}, 3\frac{E_0}{2}, 4\frac{E_0}{2}, \ldots, (2^{n+1}-2)\frac{E_0}{2}\right\}.$$

The first luminous flux set is incremented by $$\frac{E_0}{2},$$

and includes a total of $2^{n+1}-1$ luminous fluxes. At the output target bit depth n+1, the second luminous flux set composed of the displayable luminous fluxes $E_{total}$ after combination is $$\left\{0, \frac{E_0}{2}, 2\frac{E_0}{2}, 3\frac{E_0}{2}, 4\frac{E_0}{2}, \ldots, (2^{n+1}-1)\frac{E_0}{2}\right\},$$

which is incremented by $$\frac{E_0}{2},$$

and includes a total of $2^{n+1}$ luminous fluxes. Therefore, compared with the second luminous flux set at the output target bit depth, the first luminous flux set lacks the luminous flux $$(2^{n+1}-1)\frac{E_0}{2}.$$

In an embodiment, the first light modulator 501 and the second light modulator 502 are analog spatial light modulators, such as Liquid Crystal on Silicon (LCoS) or Liquid Crystal Display (LCDs). A sequence set $\{r_1, r_2, \ldots, r_{2^n-1}\}$ may correspond to a voltage applied to a liquid crystal pixel unit under a certain grayscale value. A corresponding relationship between the voltage applied to the liquid crystal pixel unit and $$\sum_{i=1}^{2^n-1} r_i$$

can be established, where 0 corresponds to an off state, and $2^n-1$ corresponds to an on state. A sequence set $\{t_1, t_2, \ldots, t_{2^n-1}\}$ corresponds to the voltage applied to the liquid crystal pixel unit under a certain grayscale value. A corresponding relationship between the applied voltage and $$\sum_{j=1}^{2^n-1} t_j$$

can be established, where 0 corresponds to an off state, and $2^n-1$ corresponds to an on state.

S2: Obtaining, based on the first luminous flux set and the second luminous flux set, a value of a luminous flux to be expanded to achieve the target bit depth at the current bit depth.

In this embodiment, for example, the luminous flux is equally distributed between the reflection path and the transmission path, and the target bit depth to be achieved is n+1 bits. In this case, based on the first luminous flux set and the second luminous flux set, a luminous flux subset that the first luminous flux set lacks compared with the second luminous flux set is obtained, that is, a luminous flux subset to be expanded to achieve the target bit depth n+1. According to the above, in this embodiment, the corresponding luminous flux subset to be expanded is $$(2^{n+1} - 1)\frac{E_0}{2}.$$

In other words, to achieve the target bit depth n+1 based on the current bit depth n, the luminous flux subset $$(2^{n+1} - 1)\frac{E_0}{2}$$

needs to be added to the first luminous flux set so as to achieve the second luminous flux set corresponding to the target bit depth.

S3: Setting the value of the luminous flux to be expanded to be equal to a value of a maximum luminous flux in the first luminous flux set corresponding to the current bit depth.

The luminous flux to be expanded corresponds to a same light modulation intensity as the maximum luminous flux in the first luminous flux set, such that the value of the luminous flux to be expanded is equal to the value of the maximum luminous flux in the first luminous flux set corresponding to the current bit depth. In this embodiment, the luminous flux $$(2^{n+1} - 1)\frac{E_0}{2}$$

to be expanded corresponds to a same light modulation method as the maximum luminous flux $$(2^{n+1} - 2)\frac{E_0}{2}$$

in the first luminous flux set. That is, when the luminous flux $$(2^{n+1} - 1)\frac{E_0}{2}$$

to be expanded is modulated, the micromirrors of the first light modulator 501 and the second light modulator 502 are set to an on state. Through the above luminous flux expansion processing, the second luminous flux set at the target bit depth can be achieved, that is, the display bit depth of the display device can be increased.

In this embodiment, the modulated second light (second image light) and the modulated first light (first image light) have the same luminous flux. However, it can be understood that, in practical applications, the values of the luminous flux in the reflection path and the transmission path can be distributed based on the total value of the luminous flux to be displayed. Assuming that the luminous flux after combination is $$M\frac{E_0}{2},$$

M being a natural number, if M=2m, then a luminous flux of $$m\frac{E_0}{2}$$

can be achieved in each of the reflection path and the transmission path. If M=2m+1, a luminous flux of $$m\frac{E_0}{2}$$

can be achieved in one of the reflection path and the transmission path, and a luminous flux of $$(m+1)\frac{E_0}{2}$$

can be achieved in the other light path.

In a modified embodiment, one of the reflection path and the transmission path achieves the modulation of a part of the third primary color light as much as possible, and the other light path achieves the modulation of the remaining third primary color light. Specifically, one of the reflection path and the transmission path achieves a luminous flux or $$(2^n - 1)\frac{E_0}{2},$$

and the other light path achieves the remaining luminous flux. It can be understood that the distribution solution of the luminous flux in this embodiment is not limited to the above two solutions, and can be specifically designed according to actual needs.

Second Embodiment

The second embodiment of the present disclosure provides another control method of the display device 10. The main difference between the control method of the display device 10 in the second embodiment and the first embodiment is that the bit depth to be achieved is different. In the second embodiment, the target bit depth to be achieved is n+s bits.

It is assumed that the current bit depth is n bits, the target bit depth is n+s bits, and the second light output ratio T of the transmission path is $(2^s-1)$ times the first light output ratio R of the reflection path, s being a positive integer.

In this embodiment, the second light output ratio T is $(2^s-1)$ times the first light output ratio R, that is, $T=(2^s-1)R$, s being a natural number not less than 2. In this case, a luminous flux ratio of the second light in the transmission path to the first light in the reflection path is $(2^s-1)$.

In general, R+T=1, then $R=1/2^s$, and $T=(2^s-1)/2^s$. Thus, the luminous flux $RE_0$ corresponding to the LSB in the reflection path (i.e. the minimum luminous flux unit modulated by the first light modulator) is $$\frac{E_0}{2^s},$$

and the luminous flux $TE_0$ corresponding to the LSB in the transmission path (i.e. the minimum luminous flux unit modulated by the second light modulator) is $$(2^s - 1)\frac{E_0}{2^s}.$$

$$E_{total} = \sum_{i=1}^{2^n-1} r_i RE_0 + \sum_{j=1}^{2^n-1} t_j TE_0,$$

then the first luminous flux set composed of the displayable luminous fluxes $E_{total}$ after combination is $$\left\{0, \frac{E_0}{2^s}, 2\frac{E_0}{2^s}, \ldots, (2^s-2)\frac{E_0}{2^s}, (2^s-1)\frac{E_0}{2^s}, \ldots, (2^{n+s}-2^s)\frac{E_0}{2^s}\right\},$$

which is incremented by $$\frac{E_0}{2^s},$$

and includes a total of $2^n-2^s+1$ luminous fluxes. The output maximum luminous flux in the reflection path is $$(2^n-1)\frac{E_0}{2^s},$$

and the output minimum luminous flux unit $TE_0$ in the transmission path is $$(2^s - 1)\frac{E_0}{2^s}.$$

In order to ensure the equidistant continuity of the luminous flux set, s should satisfy s≤n. At the target bit depth n+s, the second luminous flux set composed of the displayable luminous fluxes $E_{total}$ after combination is $$\left\{0, \frac{E_0}{2^s}, 2\frac{E_0}{2^s}, \ldots, (2^s-2)\frac{E_0}{2^s}, (2^s-1)\frac{E_0}{2^s}, \ldots, (2^{n+s}-1)\frac{E_0}{2^s}\right\},$$

which is incremented by $$\frac{E_0}{2^s},$$

and includes a total of $2^{n+s}$ luminous fluxes. Compared with the second luminous flux set, the luminous fluxes to be expanded in the first luminous flux set form a set $$\left\{[2^{n+s}-(2^s-1)]\frac{E_0}{2^s}, [2^{n+s}-(2^s-2)]\frac{E_0}{2^s}, \ldots, (2^{n+s}-1)\frac{E_0}{2^s}\right\},$$

including a total of $2^s-1$ luminous fluxes. In order to achieve the target bit depth n+s completely, the value of each luminous flux to be expanded corresponds to the same light modulation intensity as the maximum luminous flux $$(2^{n+s} - 2^s)\frac{E_0}{2^s}$$

in the first luminous flux set. That is, when the luminous flux sets $$\left\{[2^{n+s}-(2^s-1)]\frac{E_0}{2^s}, [2^{n+s}-(2^s-2)]\frac{E_0}{2^s}, \ldots, (2^{n+s}-1)\frac{E_0}{2^s}\right\}$$

to be expanded are modulated, the micromirrors of the first light modulator 501 and the second light modulator 502 are set to an on state.

In addition, the values of the luminous fluxes are distributed between the reflection path and the transmission path according to the total luminous flux to be displayed. Assuming that the luminous flux output by the combination path is $$(p \times 2^s + q)\frac{E_0}{2^s},$$

p and q being natural numbers, then the first light path can achieve a luminous flux of $$(p + q)\frac{E_0}{2^s},$$

and the second light path can achieve a luminous flux of $$p(2^s - 1)\frac{E_0}{2^s}.$$

It can be understood that the distribution solution of the luminous flux in this embodiment is not limited to the above distribution solution, and can be specifically designed according to actual needs.

Third Embodiment

The main difference between the control method of the display device 10 provided by the third embodiment of the present disclosure and the second embodiment is that the method for increasing the target bit depth is different. The third embodiment reduces the minimum luminous flux unit modulated by the second light modulator 502 or the first light modulator 501 by adding a light attenuation element in the transmission path or the reflection path.

It is assumed that the current bit depth is n bits, and the ratio of the second light output ratio in the transmission path to the first light output ratio in the reflection path is greater than $(2^s-1)$ and less than $(2^{s+1}-1)$, that is $(2^r-1)R<T<(2^{r+1}-1)R$. It can be seen from the above analysis that the fundamental of increasing the bit depth is to reduce the minimum luminous flux unit of the spatial light modulator. Therefore, a light attenuation element (not shown in the figure) can be provided in the incident light path of the first light modulator 501 or the second light modulator 502 to make the ratio of the second light output ratio in the transmission path to the first light output ratio in the reflection path be $(2^s-1)$ or $(2^{s+1}-1)$. In other words, adding the light attenuation element in the transmission path can make the equivalent transmittance of the transmission path become $T'=(2^s-1)R$, that is, the attenuation amplitude of the light attenuation element is $1-(2^s-1)R/T$. Similarly, the light attenuation element can also be added in the reflection path such that the equivalent reflectance a of the reflection path satisfies $(2^{s+1}-1)R'=T$. In this way, by adding the light attenuation element in the transmission path or the reflection path, the minimum luminous flux unit modulated by the second light modulator 502 or the first light modulator 501 is reduced, so the bit depth can be increased.

It should be noted that the other modulation parts of the third embodiment are the same as those of the second embodiment, and will not be repeated herein.

Fourth Embodiment

The main difference between the control method of the display device 10 provided by the third embodiment of the present disclosure and the third embodiment is that the method for increasing the target bit depth is different. In the fourth embodiment, by adjusting the $t_{LSB}$ of the first light modulator and the second light modulator, that is, adjusting the single all-on time of the micromirrors of the DMDs, the minimum luminous flux unit modulated by the first light modulator and the second light modulator can be reduced.

It is assumed that the current bit depth is n bits, and the ratio of the second light output ratio in the transmission path to the first light output ratio in the reflection path is greater than $(2^s-1)$ and less than $(2^{2+1}-1)$, that is $(2^s-1)R<T<(2^{s+1}-1)R$, s being a positive integer. In this case, the minimum modulation duration corresponding to the LSB in the first light modulator 501 or the second light modulator 502 is adjusted, such that after the adjustment, the time during which the micromirrors in the first light modulator 501 or the second light modulator 502 are in an on state is reduced relative to the modulation time $t_{LSB}$ corresponding to the LSB. Specifically, a single all-on time of the micromirrors of the second light modulator 502 in the transmission path can be adjusted, such that the single all-on time of the micromirrors becomes $$\frac{(2^s - 1)R}{T}$$

times the original time, that is $$\frac{(2^s - 1)R}{T} \times t_{LSB}.$$

Similarly, the single all-on time of the micromirrors in the first light modulator 501 in the reflection path can also be adjusted, such that the single all-on time of the micromirrors becomes $$\frac{(2^{s+1} - 1)R}{T}$$

times the original time. In this way, by reducing the minimum modulation duration of the first light modulator 501 or the second light modulator 502 to reduce the minimum luminous flux unit to be modulated, the target bit depth can be increased.

It should be noted that the other modulation parts of the fourth embodiment are the same as those of the second embodiment, and will not be repeated herein.

Fifth Embodiment

The main difference between the control method of the display device 10 provided by the fifth embodiment of the present disclosure and the second embodiment is that, in this embodiment, by adjusting the distribution of the luminous flux in the transmission path and the reflection path, the minimum luminous flux unit modulated by the second light modulator 502 or the first light modulator 501 is reduced, thereby increasing the target bit depth.

In this embodiment, assuming that the current bit depth is n bits, the ratio of the second light output ratio T to the first light output ratio R is greater than $(2^s-1)$ and less than $(2^{s+1}-1)$, that is, $(2^s-1)R<T<(2^{s+1}-1)R$. $(2^s-1)R<T<(2^{s+1}-1)R$ is equivalent to $$\frac{1}{2^{s+1}} < R < \frac{1}{2^s}$$

under the condition of R+T=1. That is, there is a real number η, and η satisfies $$R = \frac{1}{\eta \cdot 2^s}$$

and $1<\eta<2$. On the other hand, there is a w satisfying $T=[(2^s-1)+w]R$, $1\leq w\leq 2^s-1$.

Assuming that the luminous flux after combination is $$E_{total} = (u \times 2^s + v)\frac{E_0}{2^s},$$

u,v being natural numbers, the $E_{total}$ includes at most $$\left\lfloor \frac{E_{total}}{RE_0} \right\rfloor RE_0,$$

where $\lfloor X \rfloor$ denotes a round-down function of a real number X. Therefore, it is only necessary to design a solution to distribute $$\left\lfloor \frac{E_{total}}{RE_0} \right\rfloor RE_0$$

to the transmission path and the reflection path, such that the display error of the luminous flux will not exceed $$RE_0 = \frac{E_0}{\eta \cdot 2^s}.$$

A simple light distribution solution is to take $$\alpha = \left\lfloor \frac{\left\lfloor \frac{E_{total}}{RE_0} \right\rfloor}{(2^s-1)+w} \right\rfloor \text{ and } \beta = \left\lfloor \frac{E_{total}}{RE_0} \right\rfloor - \alpha[(2^s-1)+w].$$

The definition rule of the round-down function signifies that $\alpha, \beta$ are non-negative integers.

$$E_{total} \approx \left\lfloor \frac{E_{total}}{RE_0} \right\rfloor \cdot RE_0 = \alpha \cdot [(2^s-1)+w]RE_0 + \beta \cdot RE_0 = \alpha \cdot TE_0 + \beta \cdot RE_0,$$

that is, a luminous flux of $\alpha \cdot TE_0$ is achieved in the transmission path, and a luminous flux of $\beta \cdot RE_0$ is achieved in the reflection path. In this implementation solution, since the minimum luminous flux unit $RE_0$ satisfies $$\frac{E_0}{2^{s+1}} < RE_0 < \frac{E_0}{2^s},$$

it is less than the minimum luminous flux unit $$\frac{E_0}{2^s}$$

in the second embodiment, so it meets the display requirement of the target bit depth of n+s bits.

Compared with the prior art, the control method of the display device 10 provided in the first to fifth embodiments of the present disclosure can increase the bit depth by distributing the blue light to the first light path and the second light path. This solves the problem of insufficient color gradation of blue light, thereby improving the display quality. It can be understood that, in the embodiments of the present disclosure, regarding the issues discussed in the present disclosure, the reflection path and the transmission path are symmetrical with each other. Therefore, the reflection path and the transmission path in the above embodiments can be interchanged.

It should be noted that, within the scope of the spirit or essential features of the present disclosure, the implementation solution applicable to the control method of the display device 10 in the first embodiment can also be applicable to the second to fifth embodiments, which will not be repeated herein.

Sixth Embodiment

The sixth embodiment of the present disclosure provides another control method of the display device 10. It is assumed that a heat load generated by the first primary color light on the first light modulator 501 is $g_1'$, a heat load generated by the second primary color light on the second light modulator 502 is $g_2''$ and heat loads generated by the third primary color light on the first light modulator 501 and the second light modulator 502 are $g_3'$ and $g_3''$, respectively. Therefore, the principle of light splitting design is to make the difference between $g'=g_1'+g_3'$ and $g''=g_2''+g_3''$ as small as possible. In other words, the difference between the sum of the heat loads generated by the first primary color light and a part of the third primary color light on the first light modulator 501 and the sum of the heat loads generated by the second primary color light and a part of the third primary color light on the second light modulator 502 is less than a preset threshold.

Figure 6:
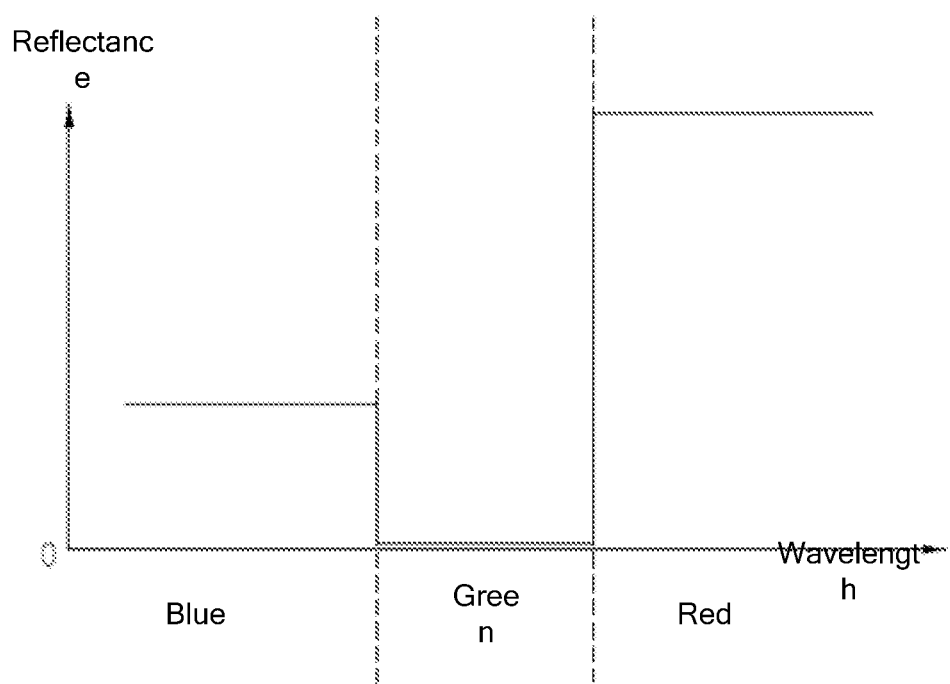
FIG. 6 shows a reflectance curve of a light splitting element.

For example, the heat load on the first light modulator 501 includes $g_R'$ corresponding to the red light and $g_B'$ corresponding to the reflected blue light, and the heat load on the second light modulator 502 includes $g_G''$ corresponding to the red light and $g_B''$ corresponding to the reflected blue light. It is assumed that $g_R'=20$ W, $g_G''=15$ W, and $g_b=8$ W. Therefore, without considering the efficiency loss of light splitting, the heat load of the blue light reflected to the first light modulator 501 can be designed to be 1.5 W, and the heat load of the blue light transmitted to the second light modulator 502 can be designed to be 6.5 W. In this case, the heat load $g'=g_R'+g_B'=20+1.5=21.5$ W on the first light modulator 501 is equal to the heat load $g''=g_R''+g_B''15+6.5=21.5$ W on the second light modulator 502, and the corresponding reflectance and transmittance of the blue light are 18.75% and 81.25%, respectively. The reflectance of the light splitting element 305 for different wavelengths is shown in FIG. 6. In the wavelength range corresponding to the blue light, the reflectance of the light splitting element 305 is relatively low, such that most of the blue light can be transmitted. In the wavelength range corresponding to the green light, the reflectance of the light splitting element 305 is almost zero, such that all the green light can be transmitted. In the wavelength range corresponding to the red light, the reflectance of the light splitting element 305 is relatively high, and almost all the red light can be reflected.

This design reduces the difference in the heat loads of the two spatial light modulators generated by green and red light. It can also avoid image shift difference between the first light modulator and the second light modulator due to unbalanced temperature rises of the first light modulator and the second light modulator. Therefore, it can avoid the problem of relative displacement of the dual spatial light modulators, which will cause deterioration of display quality.

In the display device and the control method thereof provided by the present disclosure, the display bit depth of the primary color light is increased by distributing the primary color light to the first light modulator and the second light modulator for modulation, thereby improving the color gradation displayed by the primary color light. Meanwhile, the solution of distributing the primary color light to different spatial light modulators can compensate for the difference in the heat loads of the spatial light modulators. It avoids the image shift difference between the first light modulator and the second light modulator due to the unbalanced temperature rises thereof, thereby avoiding the relative displacement of the two light modulators, which leads to deterioration of display quality.

It can be understood that the above control method of the display device 10 is not limited to the case of distributing the blue light to the first light path and the second light path separately. In fact, as long as the same color display is achieved through two independent light paths, the solutions involved in the embodiments of the present disclosure can be used to increase the display bit depth and balance the heat loads of the dual spatial light modulator.

For those skilled in the art, it is apparent that the present disclosure is not limited to the details of the foregoing exemplary embodiments, and that the present disclosure can be implemented in other specific forms without departing from the spirit or basic features of the present disclosure. Therefore, the embodiments should be regarded as exemplary and non-limiting in every respect, and the scope of the present disclosure is defined by the appended claims rather than the above description. Therefore, all changes falling within the meaning and scope of equivalent elements of the claims should be included in the present disclosure. Any reference numeral in the claims should not be considered as limiting the involved claims. In addition, it is apparent that the word "including" does not exclude other units or steps, and a singular number does not exclude a plural number. A plurality of apparatuses stated in the apparatus claims may also be implemented by a same apparatus or system through software or hardware. The terms such as "first" and "second" are used to denote names and do not indicate any particular order.

Finally, it should be noted that the foregoing embodiments are only intended to describe, rather than to limit the technical solutions of the present disclosure. Although the present disclosure is described in detail with reference to the preferred embodiments, those of ordinary skill in the art should understand that modifications or equivalent replacements may be made to the technical solutions of the present disclosure without departing from the spirit and scope of the technical solutions of the present disclosure.

REFERENCE NUMERALS

Display device 10
Light source system 100
First light source 101
Second light source 102
Light source controller 201, 202
Speckle reduction element 310
Yellow-transmitting and blue-reflecting wave plate 301
Wavelength conversion apparatus 401
Yellow phosphor 402
Fluorescent light collection lens assembly 302
Homogenizing element 303
Relay lens 304
Light splitting element 305
Total internal reflection (TIR) prism 306, 307
First light modulator 501
Second light modulator 502
Light combining element 308
Controller 601, 602
Lens 309
Steps of control method of display device S1, S2, S3, S11, S12, S111, S112

The invention claimed is:

1. A display device, comprising:
a light source system, configured to emit a plurality of primary color light;
a light splitting element, configured to split at least one of the plurality of the primary color light into first light and second light, wherein a ratio of luminous flux of the first light to the at least one of the plurality of primary color light is defined as a first light output ratio, and a ratio of luminous flux of the second light to the at least one of the plurality of primary color light is defined as a second light output ratio;
a first light modulator, located in a light path of the first light to modulate the first light and output a first luminous flux unit based on the first light and a minimum modulation duration of the first light modulator; and
a second light modulator, located in a light path of the second light to modulate the second light to output the second light along a same light path as the first light after being modulated, and output a second luminous flux unit based on the second light and a minimum modulation duration of the second light modulator;
wherein a second luminous flux set is obtained by performing a preset processing on a first luminous flux set composed of luminous fluxes output by a combination path in which light output by the first light modulator and light output by the second light modulator are combined; and
the second luminous flux set corresponds to a luminous flux set at a high display bit depth of the display device.

2. The display device according to 1, wherein
the light source system emits mixed light comprising first primary color light and second primary color light; and
the at least one of plurality of primary color light is a third primary color light.

3. The display device according to 2, wherein
in a first time sequence, the first primary color light enters the first light modulator for modulation, and the second primary color light enters the second light modulator for modulation; and
in a second time sequence, the first light enters the first light modulator for modulation, and the second light enters the second light modulator for modulation.

4. The display device according to 3, wherein
a difference between a sum of heat loads generated by the first primary color light and the first light on the first light modulator and that generated by the second primary color light and the second light on the second light modulator is less than a preset threshold.

5. The display device according to 1, wherein
a light attenuation element is arranged in a first light path of the first light to reduce the first luminous flux unit modulated and output by the first light modulator.

6. The display device according to claim 1, wherein a ratio of the second light output ratio to the first light output ratio is $2^s-1$, s being a positive integer.

7. The display device according to claim 1, wherein a ratio of the second light output ratio to the first light output ratio is greater than $2^s-1$ and less than $2^{s+1}-1$, s being a positive integer.

8. The display device according to 1, wherein a light attenuation element is arranged in a second light path of the second light to reduce the second luminous flux unit modulated and output by the second light modulator.

9. The display device according to claim 1, wherein when the ratio of the second light output ratio in the second light path to the first light output ratio in the first light path is greater than $(2^s-1)$ and less than $(2^{s+1}-1)$, which is $(2^s-1)R<T<(2^{s+1}-1)R$, a single all-on time of micromirrors of the second light modulator in the second light path is adjusted to be $$\frac{(2^s-1)R}{T} \times t_{LSB},$$

wherein
s is a positive integer, $t_{LSB}$ is a modulation time corresponding to the least significant bit (LSB), R is a first light output ratio, and T is a second light output ratio.

10. The display device according to claim 1, wherein when the ratio of the second light output ratio in the second light path to the first light output ratio in the first light path is greater than $(2^s-1)$ and less than $(2^{s+1}-1)$, which is $(2^s-1)R<T<(2^{s+1}-1)R$, a single all-on time of micromirrors of the first light modulator in the first light path is adjusted to be $$\frac{(2^{s+1}-1)R}{T} \times t_{LSB},$$

wherein
s is a positive integer, $t_{LSB}$ represents a modulation time corresponding to the least significant bit (LSB), R represents a first light output ratio, and T represent s a second light output ratio.

11. The display device according to claim 1, wherein the luminous flux in the second light path is a $TE_0$, and the luminous flux in a first light path represents $\beta \cdot RE_0$, wherein $$\alpha = \left\lfloor \frac{\left\lfloor \frac{E_{total}}{RE_0} \right\rfloor}{(2^s-1)+w} \right\rfloor, \beta = \left\lfloor \frac{E_{total}}{RE_0} \right\rfloor - \alpha[(2^s-1)+w],$$

s is a positive integer; $\alpha$ and $\beta$ are both negative integers, w is real number, $E_{total}$ indicates luminous flux after combination, $E_0$ indicates a standard luminous flux unit, $RE_0$ is a luminous flux corresponding to the least significant bit of the first light path, and $TE_0$ is a luminous flux corresponding to the least significant bit of the second light path.

12. A control method of a display device, wherein the display device comprises a light source system configured to emit a plurality of primary color light, and a light splitting element configured to split at least one of the plurality of the primary color light into first light and second light, wherein
a luminous flux ratio of the first light to the at least one of the plurality of primary color light is defined as a first light output ratio, and a luminous flux ratio of the second light to the at least one of the plurality of primary color light is defined as a second light output ratio; and
the control method of the display device comprises:
obtaining, based on the first light output ratio and the second light output ratio, a first luminous flux set composed of values of luminous fluxes output by a combination path at a current bit depth, and a second luminous flux set composed of values of luminous fluxes output by the combination path at a target bit depth respectively;
obtaining, based on the first luminous flux set and the second luminous flux set, a value of a luminous flux to be expanded to achieve the target bit depth at the current bit depth; and
adjusting a mapping relationship between the value of each luminous flux to be expanded and a value of a maximum luminous flux in the first luminous flux set corresponding to the current bit depth based on a display bit depth of the display device.

13. The control method according to claim 12, wherein said obtaining, based on the first light output ratio and the second light output ratio, a first luminous flux set composed of values of luminous fluxes output by a combination path at a current bit depth and a second luminous flux set composed of values of luminous fluxes output by the combination path at a target bit depth comprises:
obtaining, based on the first light output ratio and the second light output ratio, minimum luminous flux units modulated by a first light modulator and a second light modulator within a minimum modulation duration, and defining the minimum luminous flux units as a first luminous flux unit and a second luminous flux unit, respectively; and
obtaining, based on the minimum luminous flux units modulated by the first light modulator and the second light modulator, the first luminous flux set composed of values of luminous fluxes output by the combination path at the current bit depth and the second luminous flux set composed of values of luminous fluxes output by the combination path at the target bit depth.

14. The control method according to claim 13, wherein said obtaining, based on the first light output ratio and the second light output ratio, minimum luminous flux units output by a first light modulator and a second light modulator within a minimum modulation duration comprises:
modulating the first light and the second light by the first light modulator, obtaining a minimum luminous flux unit output by the first light modulator within the minimum modulation duration at the current bit depth unit, and defining the minimum luminous flux unit as a standard luminous flux unit; and
obtaining, based on the standard luminous flux unit, the first light output ratio and the second light output ratio, the minimum luminous flux units output by the first light modulator and the second light modulator within the minimum modulation duration.

15. The control method according to claim 14, wherein the first luminous flux set composed of the values of the luminous fluxes output by the combination path at the current bit depth is $$E_{total} = \sum_{i=1}^{2^n-1} r_i RE_0 + \sum_{j=1}^{2^n-1} t_j TE_0,$$

wherein
the standard luminous flux unit is $E_0$;
the first light output ratio is R, $R \leq 1$, and the minimum luminous flux unit modulated by the first light modulator within the minimum modulation duration is $RE_0$;
the second light output ratio is T, $T \leq 1$, and the minimum luminous flux unit output by the second light modulator within the minimum modulation duration is $TE_0$;
wherein $E_0$ represents the he standard luminous flux unit; and
$0 \leq r_i \leq 1$, $r_i$ denoting a state corresponding to an i-th modulation of the first light modulator in each frame of image; and $0 \leq t_j \leq 1$, $t_j$ denoting a state corresponding to a j-th modulation of the second light modulator in each frame of image.

16. The control method according to claim 15, wherein if a ratio of the second light output ratio T to the first light output ratio R is $2^s-1$, s being a positive integer, luminous fluxes output by the combination path comprise a first luminous flux set composed of a total of $2^{n+s}-2^s+1$ luminous fluxes incremented by $$\frac{E_0}{2^s}$$

as a unit, wherein
luminous fluxes at the target bit depth comprise a second luminous flux set composed of a total of $2^{n+s}$ luminous fluxes incremented by $$\frac{E_0}{2^s}$$

as a unit.

17. The control method according to claim 14, further comprising:
obtaining, based on the first luminous flux set and the second luminous flux set, a luminous flux subset missing in the first luminous flux set compared to the second luminous flux set; and
adding a value of the luminous flux subset missing in the first luminous flux set based on the luminous flux mapping relationship.

18. The control method according to claim 13, further comprising:
obtaining, based on the first luminous flux set and the second luminous flux set, a luminous flux subset missing in the first luminous flux set compared to the second luminous flux set; and
adding a value of the luminous flux subset missing in the first luminous flux set based on the luminous flux mapping relationship.

19. The control method according to claim 12, further comprising:
obtaining, based on the first luminous flux set and the second luminous flux set, a luminous flux subset missing in the first luminous flux set compared to the second luminous flux set; and
adding a value of the luminous flux subset missing in the first luminous flux set based on the luminous flux mapping relationship.

20. The control method according to claim 19, further comprising: making the luminous flux subset missing in the first luminous flux set to correspond to the same mapping relationship, such that the value of the luminous flux subset that is missed is equal to a value of a maximum luminous flux in the first luminous flux set.

* * * * *